Jan. 4, 1966  F. HECHT  3,227,183
WATER BOX LOCK
Filed Feb. 14, 1963

INVENTOR

Frank Hecht

United States Patent Office 3,227,183
Patented Jan. 4, 1966

3,227,183
WATER BOX LOCK
Frank Hecht, Carteret, N.J.
(1 Daniel St., Port Reading, N.J.)
Filed Feb. 14, 1963, Ser. No. 258,513
6 Claims. (Cl. 138—89)

This invention relates generally to a manually operated locking device for use within a pipe or similar structure and more particularly it is embodied as a water box lock.

With regard to the use of this invention as a water box lock, it is significant to mention that presently individuals can readily tamper with the valve inside their waterbox which controls the flow of water from the main to their home. Prior art closures and locking devices are characterized by their attempting to eliminate tampering with the waterbox valve by providing locked covers for the pipe entrance to the valve. The use of ordinary tools can be utilized to effect the removal of these closures and devices. The present invention consists of improvements in the means for preventing unwarranted removal of a locking device.

Therefore, one of the more important objects of this invention is to provide a locking device which cannot be operated with the use of ordinary tools, by virtue of its construction and its positioning within a pipe or similar structure.

Another object is to provide a locking device of relatively simple construction, easily installed within a waterbox pipe at some distance from the entrance to the pipe, having its working parts unexposed.

A further object is to provide a locking device, that can be rigidly fixed within a pipe, having a locking mechanism that can be readily installed or removed from its stationary holding device to prevent or allow access to the water valve.

Other objects and advantages will become apparent upon proceeding with the description read in light of the accompanying drawings, in which is shown one of the various possible embodiments of this invention, wherein like characters denote corresponding parts in the several views, and in which.

Figure 4:
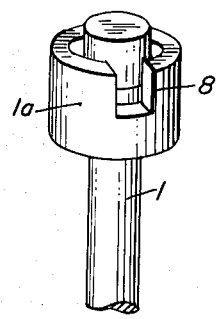
FIGURE 4 is a perspective view of the unit main screw.

Referring now to the drawings, the head 1a of the unit main screw 1, shown by itself in FIGURE 4, rests on the upper flange 3a of the middle plate 3. The partially threaded shank of the unit main screw 1 passes through and is aligned by the central opening 3c of the middle plate 3. Washer 4, interposed between the upper and lower flanges of the middle plate 3, in the internal opening 3d further aligns the unit main screw 1. Extending legs 5 are pivotably attached to the lower flange 3b of plate 3, and are pulled towards one another by the leg spring 6. Internally threaded bottom plate 7, on the partially threaded shank of the unit main screw 1, has two external slots 7a, through which the extending legs 5 pass. The inside faces of the extending legs 5 are inclined with respect to the outer faces, and these inner faces rest against the inclined backs of the external slots 7a in the bottom plate 7. In the head 1a of the unit main screw 1 are keyways 8, into which fit keys 9, that are pulled towards one another within the confines of the head 1a by a key spring 10. The top outer portion of the head shown as head cap 2 is attached to the top of the unit main screw 1 by screws (not shown). It is a matter of choice whether the head cap 2 is made an integral part of the unit main screw 1 or whether, as described, it is a separate part mechanically attached. The unit main screw can be constructed in parts depending on fabrication techniques to be used, but the independent parts taken together still form what has been described as a unit main screw.

Figure 2:
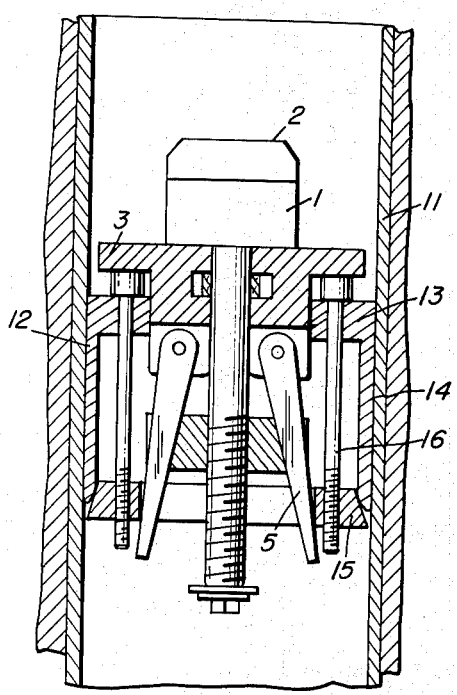
FIGURE 2 is a plan view of the locking mechanism in a locked position in its holding device.

In FIGURE 2, the locking mechanism just described is shown in a locked position in its related holding device 12. The holding device 12 has a top plate 13 with expandible side wall 14. Wedge plate 15 is held in place by screws 16, which are supported from the top plate 13. The top plate 13 and wedge plate 15 each have center openings of a size and shape required for the admittance of the locking mechanism.

Figure 3:
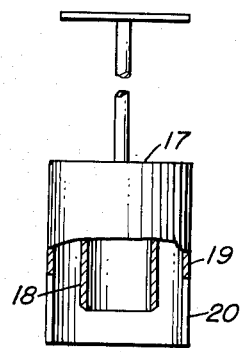
FIGURE 3 is a partially sectioned view of a wrench used to operate the locking mechanism.

A long handle wrench 17 shown in FIGURE 3, has an inner circular tube 18, and an outer circular tube 19 which has two keyway cut-outs 20 that coincide in position with the keyways 8 in the head 1a.

Figure 1:
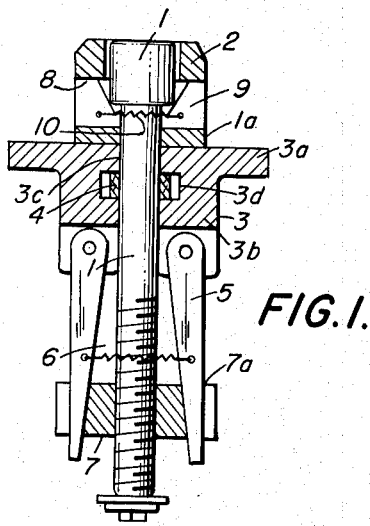
FIGURE 1 is a sectional assembly of the locking mechanism.

The method of operation of the previously described invention is as follows: The holding device 12 is positioned within the pipe at a specified distance from the pipe entrance. At the specified position, the holding screws 16 are tightened, forcing the wedge plate 15 upwards and by so doing the side wall 14 is expanded against the pipe wall 11, thus rigidly fixing the holding device 12 within the pipe. The locking mechanism in its unlocked position, as shown in FIGURE 1, is now fitted into the holding device with the upper flange 3a resting upon the heads of the holding screws 16. The wrench 17 is used, and the external tube 19 is slid over the head 1a. The wrench 17 is held so that the keyway cut-outs 20 line up with the keyways 8. While sliding the outer tube 19 of the wrench 17 over the head 1a, the inner tube 18 enters the passageway, between the head cap 2 and the central portion of the head 1a, making contact with and pushing against the inside inclined faces of the keys 9, forcing the keys outward along the keyways 8 and through the keyway cut-outs 20. The keys 9, now partially protruding from the keyways 8, provide gripping surfaces for the sides of the keyway cut-outs 20 in the outer tube 19. The wrench 17, turned while in this position grips the outer parts of the keys 9 and turns the unit main screw 1. As the unit main screw 1 turns, the bottom plate 7 moves upward on the shank, spreading the pivoted extending legs 5 resting in its external slots away from one another. After a number of turns of the unit main screw 1, the ends of the extending legs 5 will engage the wall of the center opening in the wedge plate 15, thereby locking the locking mechanism within the holding device 12. Upon removing the wrench, the keys 9, under the force exerted by the key spring 10, return to their initial position, leaving no protruding surfaces on the head 1a. When it is desired to remove the locking mechanism to gain access to the waterbox valve through the holding device 12, the unit main screw 1 would have to be turned in the opposite direction to disengage the locking mechanism.

The preceding description of the invention has shown it to be an effective and relatively simple locking device that minimizes tampering with its own mechanism by its construction and positioning.

For the purpose of illustration, a single embodiment of the invention has been shown and described, but of course it should be understood that it may assume numerous other forms than that shown.

Therefore, without being limited to the exact embodiment shown, what I claim is:

1. A locking device having, in combination, a tubular structure; locking mechanism means comprising a rotatable unit main screw having a head, internal keyways and connecting passageway within said head of said unit main screw, laterally movable key means within said keyways, first plate means supporting and positioning said head of said unit main screw on one side, extending legs pivotably attached to the other side of said first plate, internally threaded second plate means with external slots receiving said extending legs, inclined backs of said external slots adapted to spread said extending legs apart with upward motion of said second plate means, said screw threaded into said second plate means; holding means fixed within said tubular structure abutting said first plate means on one end thereof having the other end engaged by said extending legs to lock said locking mechanism within said holding means.

2. The combination claimed in claim 1 wherein said movable key means is disposed in diametrically opposite keyways.

3. The combination claimed in claim 2 wherein said movable key means is embodied as two keys operably attached to one another by a spring, with each of said keys having an inclined end faced inward and upward toward the central portion of said head.

4. The combination of claim 3 wherein said passageway formed between outer portion and said central portion of said head, is axially disposed with respect to said screw.

5. The combination claimed in claim 3 wherein said holding device means is fixed within said tubular structure by a third wedge plate forcing the side wall of said holding device against the wall of said tubular structure.

6. The combination claimed in claim 5 wherein said wedge plate is engaged by said extending legs.

References Cited by the Examiner
UNITED STATES PATENTS

| | | | |
|---|---|---|---|
| 1,191,497 | 7/1916 | Dauphinee | 137—371 X |
| 1,229,429 | 6/1917 | Farley | 137—371 |
| 1,281,438 | 10/1918 | Tuttle | 81—121.1 |
| 1,970,463 | 8/1934 | Mann | 70—175 |
| 2,363,567 | 11/1944 | Blakeman | 70—168 X |
| 2,844,021 | 7/1958 | Bryant | 70—175 |
| 2,895,362 | 7/1959 | Jamgotchian | 81—90.5 |

FOREIGN PATENTS

| | | |
|---|---|---|
| 1,166,276 | 6/1958 | France. |

M. CARY NELSON, *Primary Examiner.*

WILLIAM FELDMAN, *Examiner.*

M. BALAS, H. KLINKSIEK, *Assistant Examiners.*